(12) United States Patent
Okanoue et al.

(10) Patent No.: US 6,404,156 B1
(45) Date of Patent: Jun. 11, 2002

(54) ELECTRIC POWER STEERING EQUIPMENT

(75) Inventors: Takahiro Okanoue; Takayuki Kifuku; Katsuya Ikemoto, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/598,314

(22) Filed: Jun. 21, 2000

(30) Foreign Application Priority Data

Dec. 20, 1999 (JP) .............................. 11-360660

(51) Int. Cl.[7] ................................... H02P 7/00
(52) U.S. Cl. ....................... 318/432; 318/434
(58) Field of Search ................... 318/432, 433, 318/434, 445, 447, 448, 449, 565, 566; 180/412, 446, 443; 701/41, 42, 43; 73/862.335

(56) References Cited

U.S. PATENT DOCUMENTS

| 4,959,787 A | | 9/1990 | Morishita et al. | |
| 5,469,357 A | * | 11/1995 | Nishimoto | 180/446 |
| 5,485,067 A | * | 1/1996 | Nishimoto et al. | 318/466 |
| 5,641,916 A | * | 6/1997 | Satoh et al. | 73/862.335 |
| 5,704,446 A | * | 1/1998 | Chandy et al. | 180/446 |
| 5,835,872 A | * | 11/1998 | Matsuoka et al. | 701/41 |
| 5,894,206 A | * | 4/1999 | Noro et al. | 318/433 |
| 6,029,767 A | * | 2/2000 | Kifuku | 701/41 |

FOREIGN PATENT DOCUMENTS

| JP | Hei 6-51475 | 6/1994 |
| JP | Hei 08-142883 | 6/1996 |
| JP | Hei 11-078922 | 3/1999 |
| JP | Hei 11-321668 | 11/1999 |

* cited by examiner

Primary Examiner—Khanh Dang
(74) Attorney, Agent, or Firm—Sughrue Mion, PLLC

(57) ABSTRACT

An electric power steering equipment according to the present invention comprises a motor for providing a steering assisting force to a steering shaft, a torque detecting means for detecting a steering torque, an amplifying and phase-compensating means for amplifying and phase-compensating a detected value of the torque detecting means, and a controlling means for controlling a drive of the motor based on an output of the amplifying and phase-compensating means, wherein the controlling means restricts a control signal for driving the motor by an upper limit value and a lower limit value which are set in response to the detected value of the torque detecting means.

19 Claims, 16 Drawing Sheets

ELECTRIC POWER STEERING EQUIPMENT

BACKGROUND OF THE INVENTION

The present invention relates to an electric power steering equipment of a vehicle, etc. and, more particularly, an improvement of a steering feeling at the time of fault of a torque sensor input circuit.

FIG. 1 shows a configuration of an electric power steering equipment in the prior art. In FIG. 1, 1 denotes a steering wheel; 2, a steering shaft; 3, a torque sensor for detecting a steering force of the driver; 4, a motor for assisting the steering force of the driver; 5, reduction gears for transmitting an output torque of the motor 4 to the steering shaft 2; 6, a speed sensor for detecting a travel speed of a vehicle; 7, a battery installed in the vehicle; and 8, a controller for driving the motor 4 based on output signals of the torque sensor 3 and the speed sensor 6.

FIG. 2 is a view showing details of the controller 8 of the electric power steering equipment. A reference 9 denotes a microcontroller which includes a microprocessor MPU, memory devices (ROM and RAM), an input/output port I/O, an analog/digital converter A/D, and a pulse-width modulation signal output circuit PWM, etc. A reference 10 denotes a motor driver circuit which is composed of a bridge circuit consisting of four power MOSFETs; 11, a gate driver circuit for driving the motor driver circuit 10; and 13, an amplifier and phase compensation circuit for processing an output signal of the torque sensor 3.

Such electric power steering equipment in the prior art detects a steering force, i.e., an input torque, by the torque sensor 3 when the driver turns the steering wheel 1, and then processes a torque sensor signal by the amplifier and phase compensation circuit 13.

The amplifier and phase compensation circuit 13 amplifies and phase-compensates the torque sensor signal. The microcontroller 9 executes an arithmetic operation in compliance with a predetermined control program based on the processed torque sensor signal, and then causes the motor 4 to generate a necessary assisting torque. In this manner, in the electric power steering equipment in the prior art, the amplifier and phase compensation circuit 13 assures the resolution required for the control to thus secure the responsibility in the motor current feedback control.

In the electric power steering equipment abovementioned in the prior art, the amplifying and phase-compensating process is executed by the amplifier and phase compensation circuit 13 in response to the torque sensor signal detected by the torque sensor 3, and then the control of the motor 4 is carried out based on the processed torque sensor signal. Therefore, if the amplifier and phase compensation circuit 13 gets out of order, such a situation is brought about that the signal having no correlation with the torque sensor signal detected by the torque sensor 3, i.e., the driver's steering force is output. Thus, there is a problem that the control cannot be achieved in accordance with the driver's will.

In order to overcome such problem, as shown in FIG. 3, another controller 8 of the electric power steering equipment has been proposed in the prior art. That is, signals before and after the amplifier and phase compensation circuit 13, i.e., signals detected before and after the amplifying and phase-compensating process are input into the microcontroller 9 respectively, and then the fault of the amplifier and phase compensation circuit 13 is decided by monitoring the correlation between them.

In such controller, in order to decide the fault, the event that the correlation between the signals detected before and after the amplifying and phase-compensating process is abnormal over a predetermined time period is monitored. In this case, there are following problems. That is, if such predetermined time period is set long, a long time is needed to decide such fault after the fault has occurred, and thus the motor is controlled in response to the false torque sensor signal during such predetermined time period to generate the assisting torque, so that the behavior of the vehicle becomes unstable. On the contrary, if such predetermined time period is set short, since the signals detected before and after the amplifying and phase-compensating process have different phases by the amplifier and phase compensation circuit 13 respectively, the amplifier and phase compensation circuit 13 is decided as the fault in its transient state although the electric power steering equipment is normal.

SUMMARY OF THE INVENTION

The present invention has been made to overcome such problems, and it is an object of the present invention to provide an electric power steering equipment which is capable of suppressing the control which is made based on a false torque sensor signal at the time of the fault of an amplifier and phase compensation circuit even until such fault can be detected.

An electric power steering equipment according to the present invention comprises a motor for providing a steering assisting force to a steering shaft; a torque detecting means for detecting a steering torque; an amplifying and phase-compensating means for amplifying and phase-compensating a detected value of the torque detecting means; and a controlling means for controlling a drive of the motor based on an output of the amplifying and phase-compensating means; wherein the controlling means restricts a control signal for driving the motor by an upper limit value and a lower limit value which are set in response to the detected value of the torque detecting means.

An electric power steering equipment according to the present invention comprises a motor for providing a steering assisting force to a steering shaft; a first torque detecting means and a second torque detecting means for detecting a steering torque respectively; an amplifying and phase-compensating means for amplifying and phase-compensating a detected value of the first torque detecting means; and a controlling means for controlling a drive of the motor based on an output of the amplifying and phase-compensating means; wherein the controlling means restricts a control signal for driving the motor by using an upper limit value and a lower limit value which are set in response to the detected value of the second torque detecting means.

An electric power steering equipment according to the present invention comprises a motor for providing a steering assisting force to a steering shaft; a first torque detecting means and a second torque detecting means for detecting a steering torque respectively; an amplifying and phase-compensating means for amplifying and phase-compensating a detected value of the first torque detecting means; and a controlling means for controlling a drive of the motor based on an output of the amplifying and phase-compensating means; wherein the controlling means selects a smaller upper limit value and a smaller lower limit value out of a first upper limit value and a first lower limit value, which are set in response to the detected value of the first torque detecting means, and a second upper limit value and a second lower limit value, which are set in response to a detected value of the second torque detecting means, as an upper limit value and a lower limit value, and then restricts a control signal for driving the motor by using the upper limit value and the lower limit value.

Also, the controlling means has an amplification and phase-compensation calculating means for calculating amplification and phase compensation of the detected value of the torque detecting means, and the upper limit value and the lower limit value are set in response to a calculated result of the amplification and phase-compensation calculating means.

Also, the controlling means restricts an output of the amplifying and phase-compensating means by using the upper limit value and the lower limit value.

Also, the controlling means restricts a motor current calculated in response to an output of the amplifying and phase-compensating means by using the upper limit value and the lower limit value.

Also, the controlling means restricts a motor-applied voltage calculated in response to an output of the amplifying and phase-compensating means by using the upper limit value and the lower limit value.

Also, the controlling means compares a preceding value of restriction and a succeeding value of restriction during the restriction by using the upper limit value and the lower limit value, and controls a drive of the motor by using a value on a neutral side.

Also, the electric power steering equipment according to the present invention further comprises a speed detecting means for detecting a speed of a vehicle, and the controlling means changes a width between the upper limit value and the lower limit value in answer to the speed.

Also, the controlling means changes a width between the upper limit value and the lower limit value in answer to a magnitude of the detected value of the torque detecting means.

Also, the controlling means sets a width between the upper limit value and the lower limit value large in a same direction as a direction of the detected value of the torque detecting means and the width between them small in an opposite direction to the direction of the detected value of the torque detecting means.

Also, the controlling means stops motor driving control when the detected value of the torque detecting means gets out of a predetermined range.

Also, the controlling means changes a width between the upper limit value and the lower limit value in response to an elapsed time after an output of the amplifying and phase-compensating means or either a motor current or a motor-applied voltage calculated in response to the output of the amplifying and phase-compensating means is out of a range between the upper limit value and the lower limit value.

Also, the controlling means inhibits restriction by using the upper limit value and the lower limit value until a predetermined time has elapsed after an output of the amplifying and phase-compensating means or either a motor current or a motor-applied voltage calculated in response to the output of the amplifying and phase-compensating means is out of a range between the upper limit value and the lower limit value.

DETAILED DESCRIPTION OF THE PREFERRED EMBODIMENTS

Embodiment 1

Figure 1:
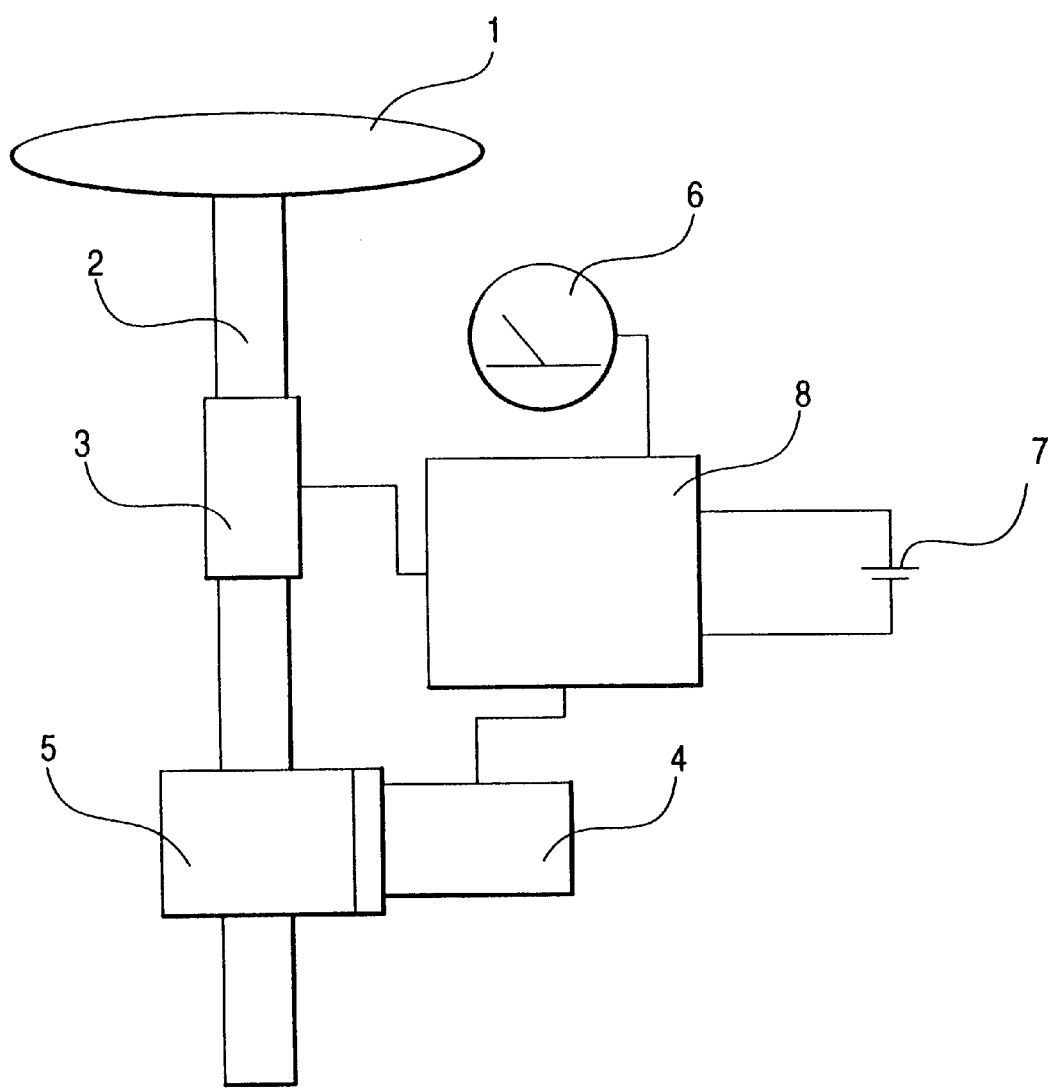
FIG. 1 is a view showing a configuration of an electric power steering equipment in the prior art.
Figure 2:
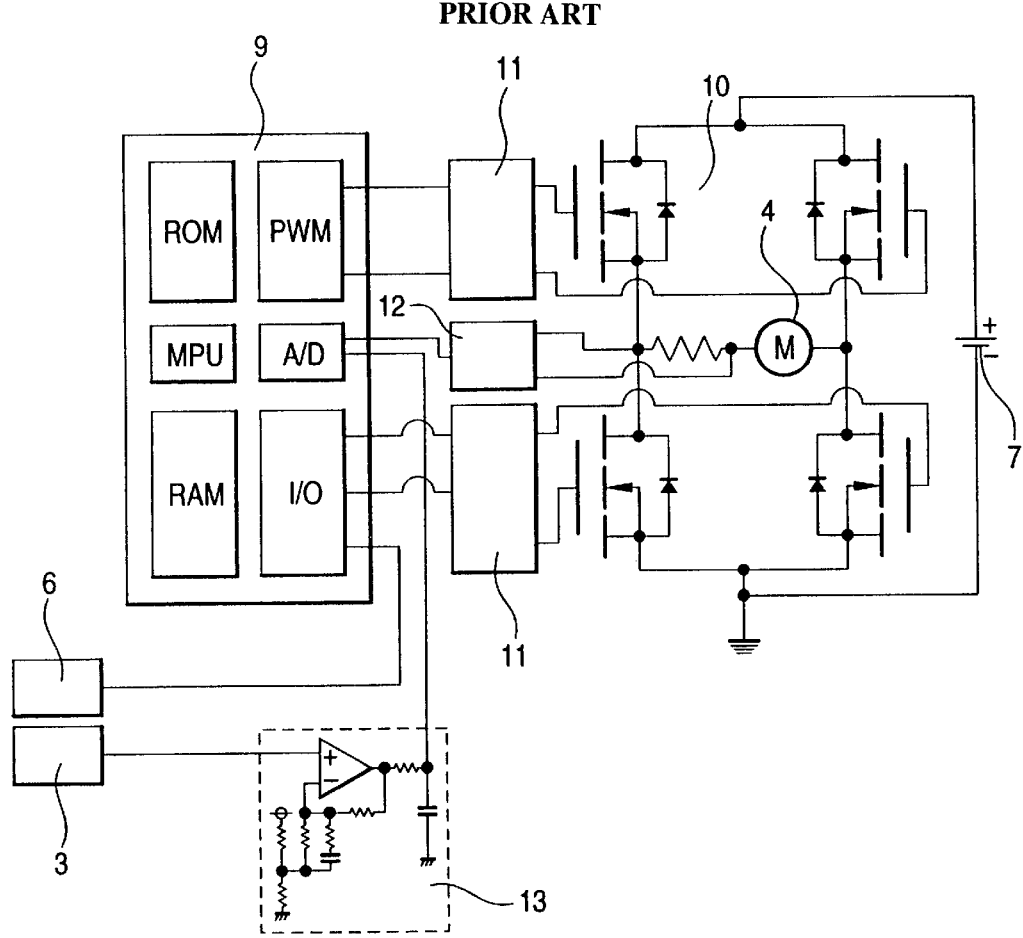
FIG. 2 is a view showing a controller of the electric power steering equipment in the prior art.
Figure 3:
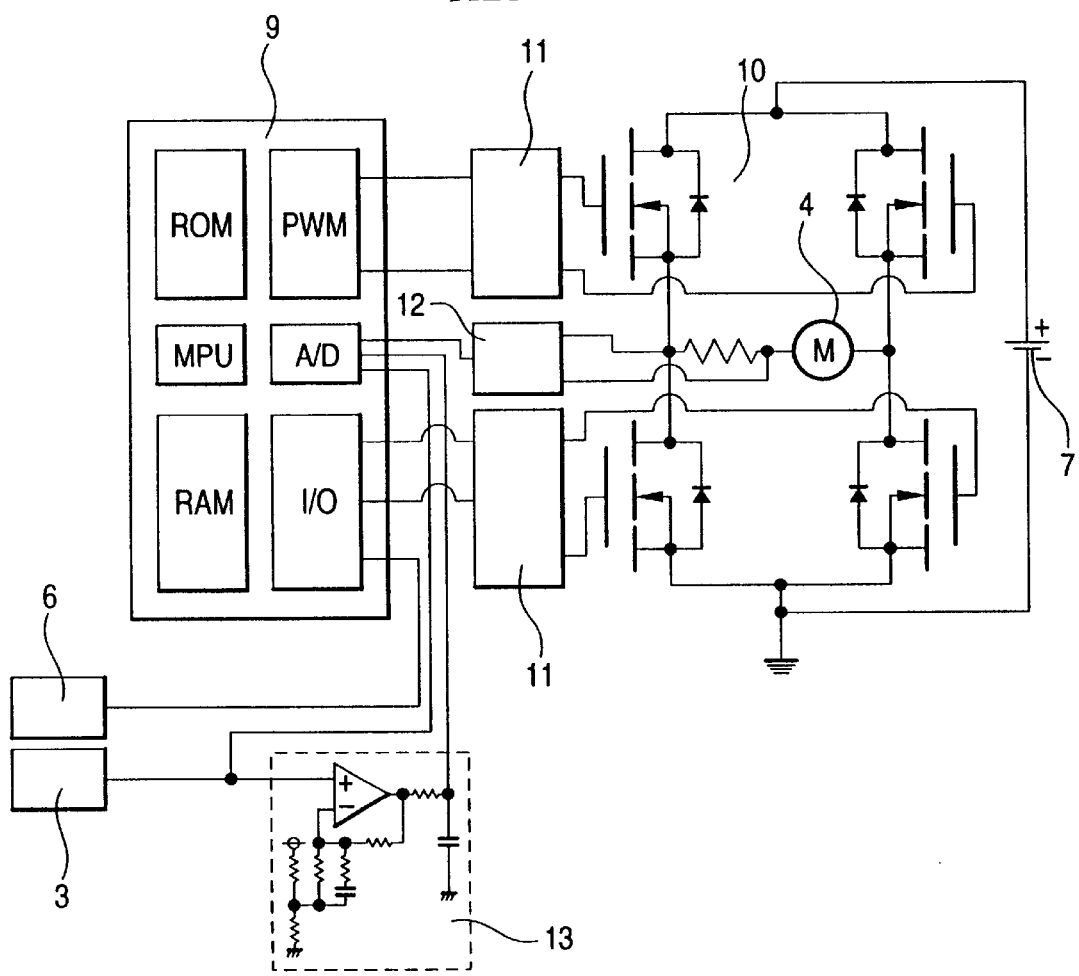
FIG. 3 is a view showing another controller of the electric power steering equipment in the prior art.
Figure 4:
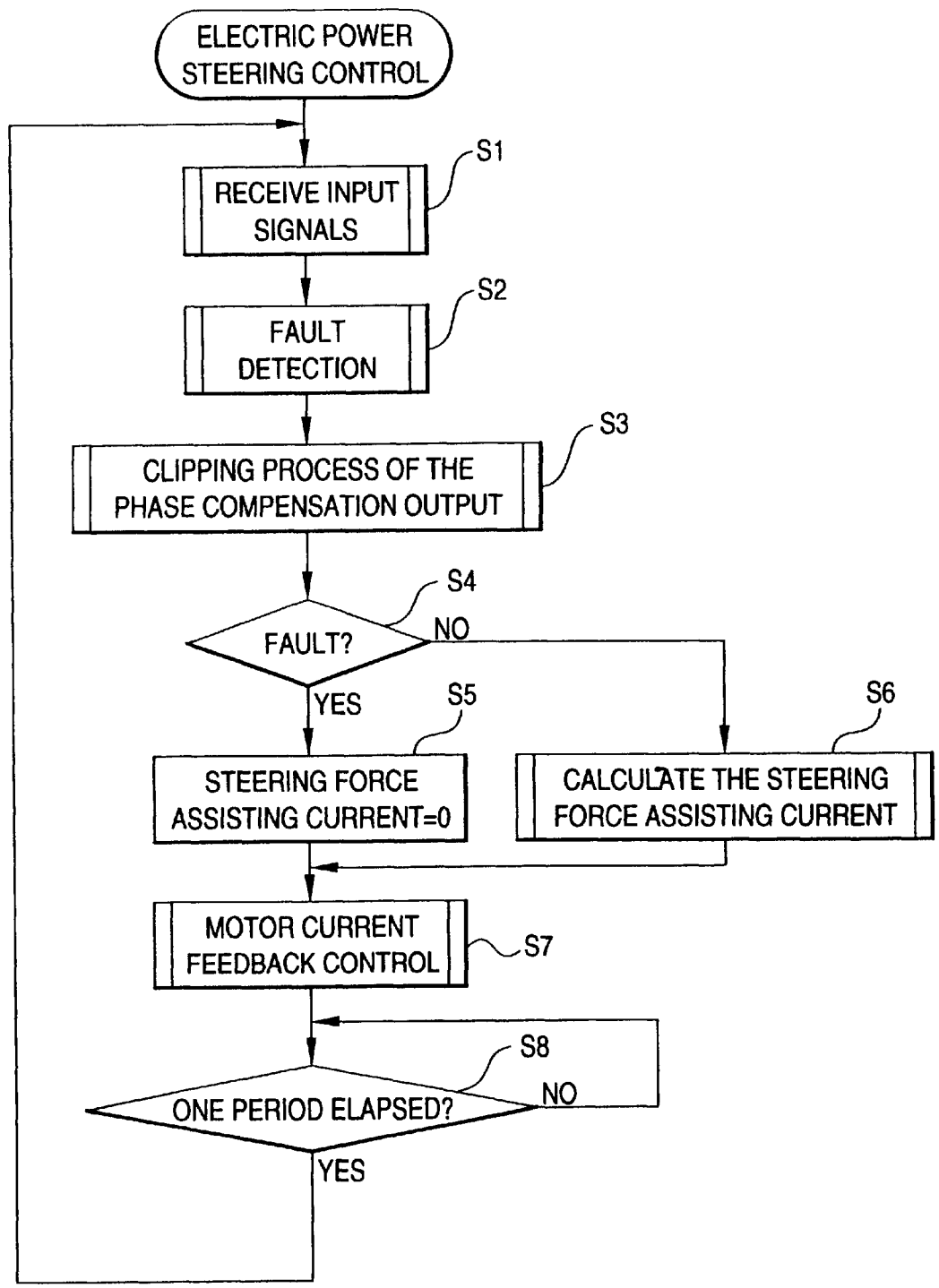
FIG. 4 is a flowchart showing an operation of an electric power steering equipment according to an embodiment 1 of the present invention.
Figure 5:
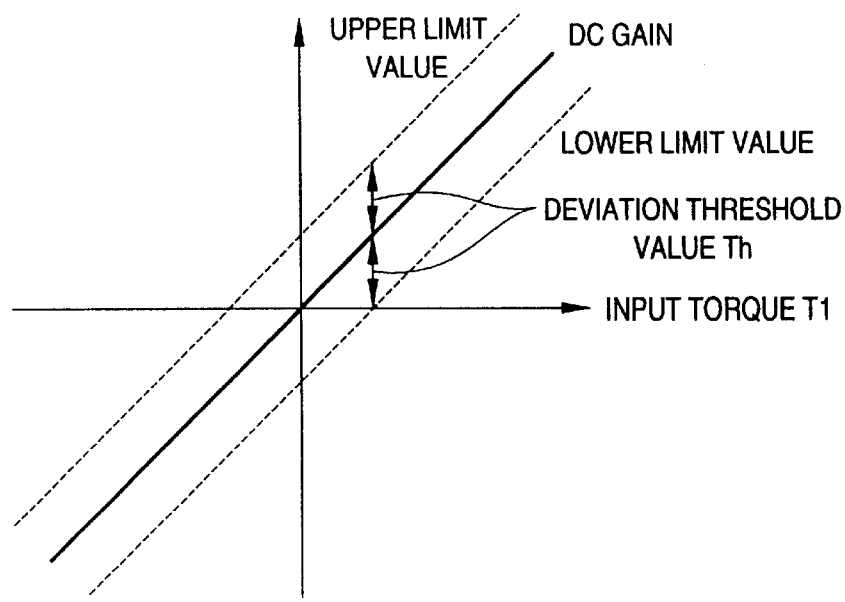
FIG. 5 is a view showing an operation of a controller of the electric power steering equipment according to the embodiment 1 of the present invention.
Figure 6:
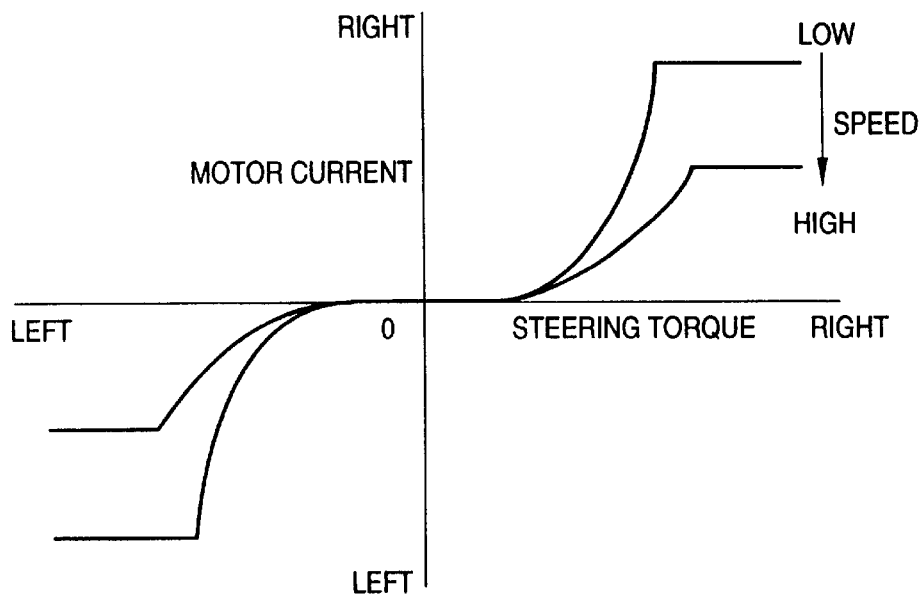
FIG. 6 is a view showing an operation of another controller of the electric power steering equipment according to the embodiment 1 of the present invention.

An electric power steering equipment according to an embodiment 1 of the present invention will be explained with reference to FIGS. 4 to 6 hereinbelow. Since a configuration of the electric power steering equipment according to the embodiment 1 of the present invention is similar to that in FIG. 3, their detailed explanation will be omitted hereunder.

Then, an operation of the embodiment 1 of the present invention will be explained in compliance with a flowchart shown in FIG. 4. In step s1, respective signals necessary for the power steering motor control, i.e., a torque sensor input signal (i.e., an input signal to the amplifier and phase compensation circuit 13), a torque sensor phase compensation output signal (i.e., an output signal from the amplifier and phase compensation circuit 13), a speed signal, etc. are received.

Then, in step s2, the fault is diagnosed by checking whether or not received signals indicate false values respectively. For example, it is checked whether or not the torque sensor input signal has the false value because of disconnection, line-to-ground fault, etc. of the sensor harness. Also, in order to execute the phase compensation, the amplifier and phase compensation circuit 13 checks in light of the overshoot caused by the transient response whether or not an error generated when the torque sensor phase compensation output signal exceeds a predetermined threshold value as a torque corrected value against the torque sensor input signal is continued for a predetermined time period. Since the predetermined time period must be set in view of a time constant in phase compensation, such predetermined time period is set to a relatively long time (e.g., about 100 msec). In addition, the amplifier and phase compensation circuit 13 also checks fault of the sensor and the harness by checking whether or not a speed signal detected value is reduced abruptly.

Then, in step s3, the torque sensor phase compensation output signal is clipped by an upper limit value and a lower limit value defined based on the torque sensor input signal. As shown in FIG. 5, the upper limit value and the lower limit value are set by providing predetermined upper and lower deviation threshold values Th to a phase compensation output TV1 which can be derived from a steering force obtained when the driver turns the steering wheel 1, i.e., an input torque T1 and an amplification factor of the amplifier and phase compensation circuit 13. In step s3, if the torque phase compensation output signal exceeds such upper limit value or falls below such lower limit value, a process of clipping the torque phase compensation output signal by using the upper limit value and the lower limit value is executed immediately.

Then, in step s4, the process goes to step s5 if the fault is detected based on the result of the fault diagnosis carried out in step s2, while the process goes to step s6 unless the fault is detected. In step s5, a steering force assisting current is set to 0 because the fault is detected. In contrast, in step s6, with reference to the torque signal obtained after the clipping process instep s3 and the speed, the steering force assisting current is calculated by looking up a table stored previously in the memory device, etc. For example, as shown in FIG. 6, the steering force assisting current has a predetermined characteristic which is increased with the increase in the steering torque and is decreased with the increase in the speed.

In step s7, an actual current of the motor 4 detected by a motor current detecting circuit (not shown) is compared with a command value of the steering force assisting current derived according to the calculation result in step s5 or step s6. Then, so-called motor current feedback control is performed such that they coincide with each other, and the motor driver circuit 10 is PWM-driven by the gate driver circuit 11. Finally, in step s8, the process is waited until one period has elapsed such that a series of processes are carried out within a predetermined period. Then, the process returns to step s1 after one period has elapsed, and the similar controls are repeated.

According to the embodiment 1 of the present invention described as above, even if the amplifier and phase compensation circuit 13 cannot normally execute amplification and phase compensation since it gets out of order and thus the output value TV1 has an excessive value deviated to the right side or the left side, the output value TV1 of the amplifier and phase compensation circuit 13 is clipped in step s3 between the upper limit value and the lower limit value which are set based on the input value T1 of the amplifier and phase compensation circuit 13. As a result, the excessive assisting torque is never generated until the fault diagnosis in step s2 is performed, and thus the behavior of the vehicle can be made stable.

Embodiment 2

Next, an embodiment 2 of the present invention will be explained hereunder. Although the controller with a single torque sensor has be explained in the embodiment 1 of the present invention, normally the controller with a plurality of torque sensors has been known as a redundant system of the torque sensor. In the embodiment 2, the case where the present invention is applied to the controller with a plurality of torque sensors will be explained hereinbelow. More particularly, based on a second torque sensor detection value T2, the clipping process is applied to the output value (control torque) TV1 which is derived via the amplifier and phase compensation circuit based on the first torque sensor detection value T1.

Figure 7:
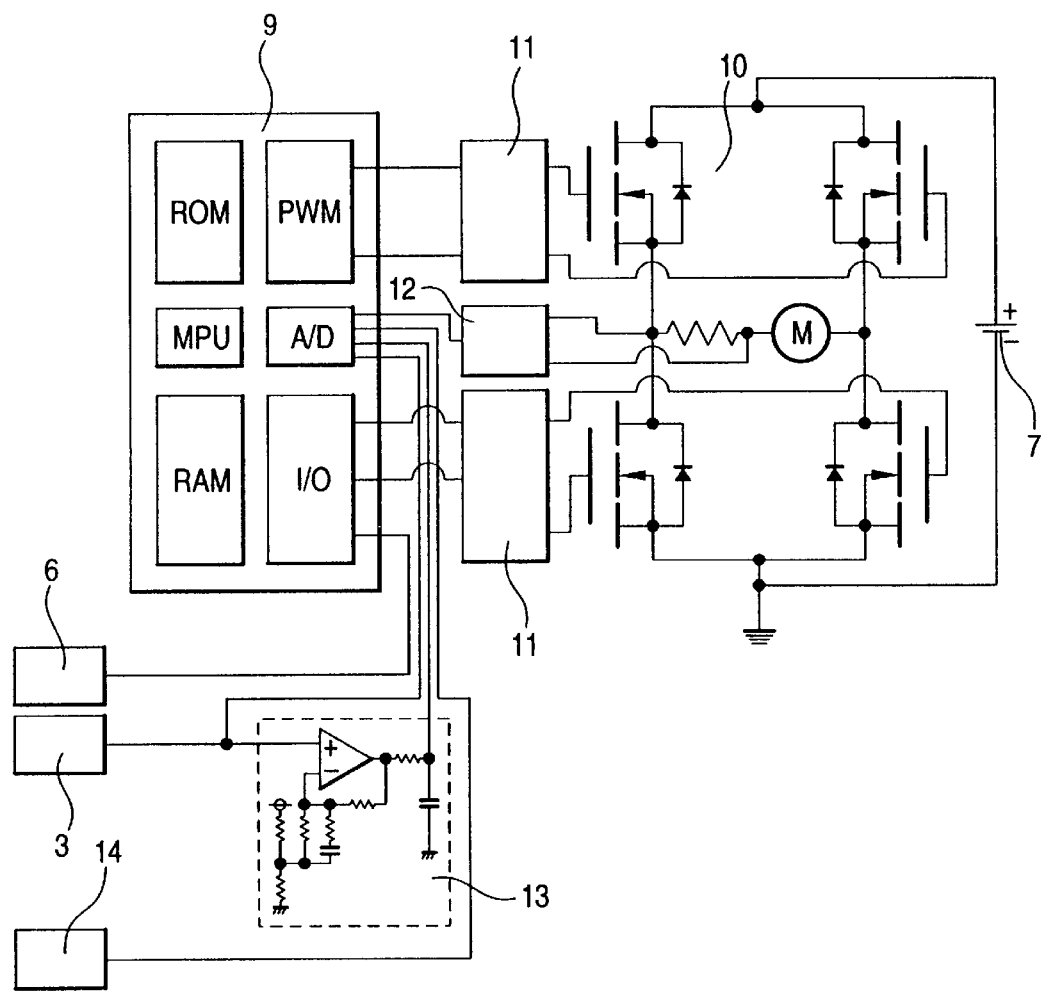
FIG. 7 is a view showing a controller of an electric power steering equipment according to an embodiment 2 of the present invention.

FIG. 7 is a view showing a controller of an electric power steering equipment according to the embodiment 2 of the present invention. The like symbols are affixed to the like portions as those in FIG. 3 and their detailed explanation will be omitted hereunder. In the embodiment 2, a second torque sensor 14 is provided to the electric power steering equipment. The torque sensor signal T2 from the second torque sensor 14 is also input into the microcontroller 9.

The microcontroller 9 executes predetermined calculation processes. In this case, only the content of the clipping process in step s3 among the calculation processes is different, but other processes are similar as those in the embodiment 1. Therefore, the clipping process having the different processing content will be explained with reference to FIG. 8 herein.

In step s21, the upper limit value Th1 and the lower limit value Th2 are set to the torque sensor signal T2 from the second torque sensor 14 to have a predetermined width respectively.

In step s22, the output value TV1 of the amplifier and phase compensation circuit 13 is compared with the upper limit value Th1 set in step s21. If the output value TV1 is larger than the upper limit value Th1, the process advances to step s23. If the output value TV1 is smaller than the upper limit value Th1, the process advances to step s26.

In step s23, it is decided whether or not the output value TV1 and the upper limit value Th1 have their torques in the same direction. If they are in the same direction, the process advances to step s24 wherein the output value TV1 is clipped by the upper limit value Th1. Then, the process is ended. If they are not in the same direction, it is decided that either the output value TV1 or the upper limit value Th1 is false. Then, the process advances to step s25 wherein the output value TV1 is set to a neutral value, e.g., 2.5 V. Then, the process is ended.

In step s26, the output value TV1 is compared with the lower limit value Th2 set in step s21. If the output value TV1 is larger than the lower limit value Th2, and then the process advances to step s27 wherein no clipping process is carried out. Then, the process is ended. In contrast, if the output value TV1 is smaller than the lower limit value Th2, and then the process advances to step s28 wherein it is decided whether or not the output value TV1 and the lower limit value Th2 have their torques in the same direction.

In step s28, if the output value TV1 and the lower limit value Th2 have their torques in the same direction, the process proceeds to step s29 wherein the output value TV1 is clipped by the lower limit value Th2. Then, the process is ended. In contrast, in step s28, unless the output value TV1 and the lower limit value Th2 have their torques in the same direction, it is decided that either the output value TV1 or the upper limit value Th1 is false. Then, the process advances to step s30 wherein the output value TV1 is set to the neutral value, e.g., 2.5 V. Then, the process is ended.

According to the embodiment 2 described above, since the electric power steering equipment has a plurality of torque sensors and the output signal can be clipped based on the other torque sensor signal even if the amplifier and phase compensation circuit is out of order, such a situation that an excessive assisting torque is generated due to an excessive output value of the amplifier and phase compensation circuit can be prevented. Therefore, the same advantage as the above embodiment 1 can be achieved such that the behavior of the vehicle can be stabilized, and both the torque sensor signals can be monitored mutually, and failures such as the fault of the torque sensor per se, open and short-circuit of the harness, etc. can be backed up. As a result, the safety of the electric power steering equipment can be improved much more.

Embodiment 3

Figure 8:
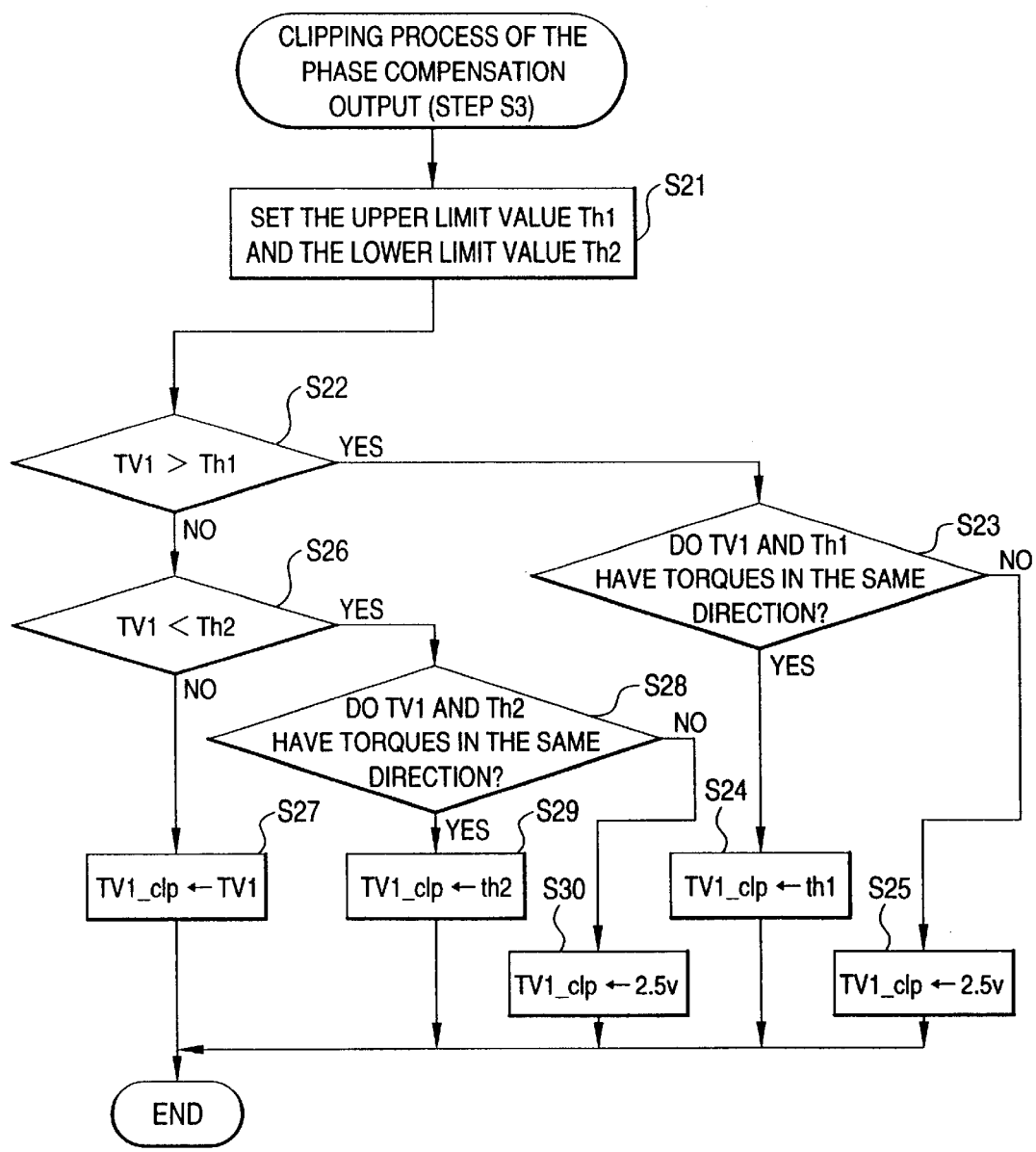
FIG. 8 is a flowchart showing an operation of the electric power steering equipment according to the embodiment 2 of the present invention.
Figure 9:
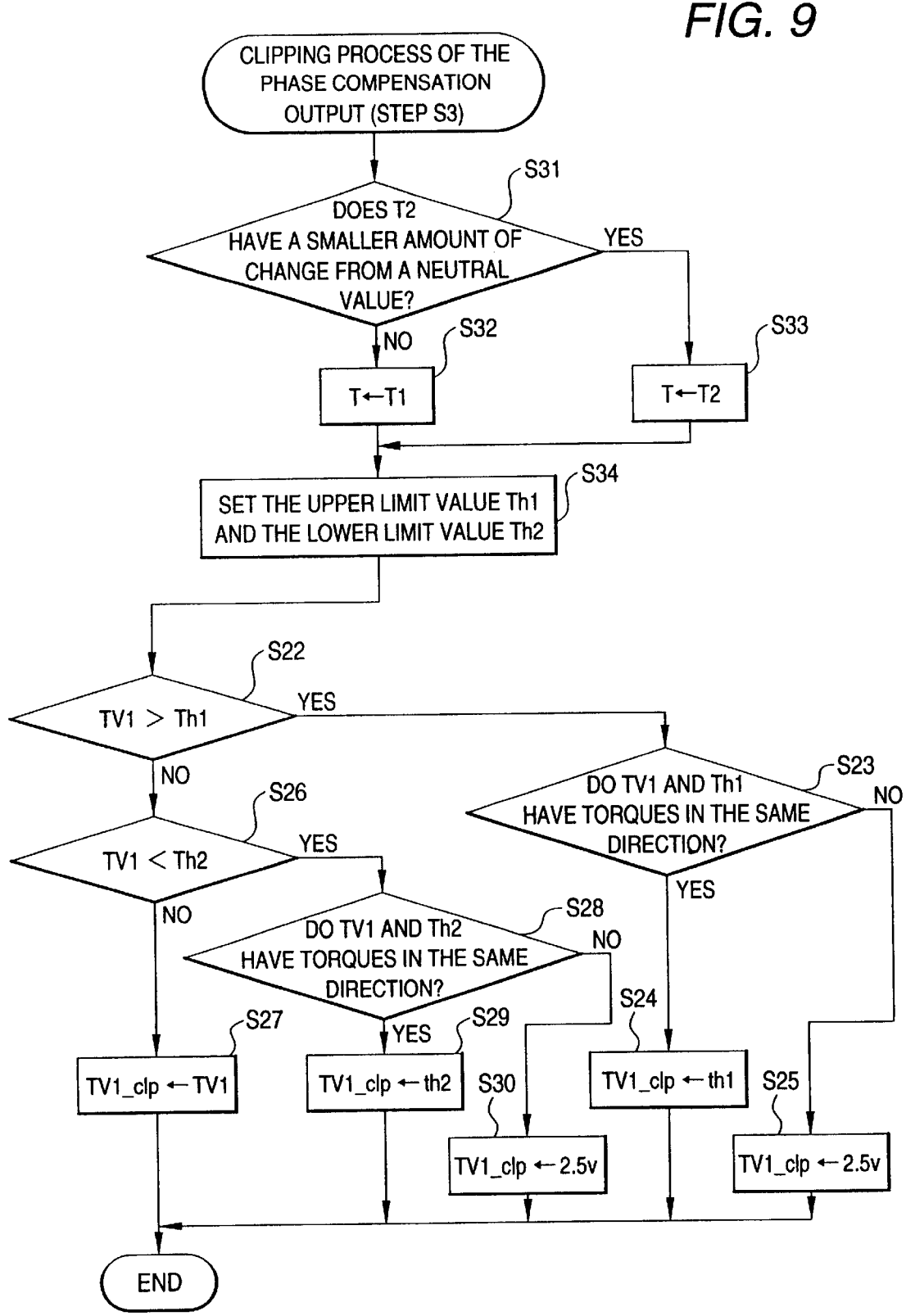
FIG. 9 is a flowchart showing an operation of an electric power steering equipment according to an embodiment 3 of the present invention.

Next, a variation of the above embodiment 2 will be explained as an embodiment 3 of the present invention hereunder. The step s21 in FIG. 8 is varied as shown in steps s31, s32, s33, and s34. In more detail, in step s31, first an amount of change of the first torque sensor signal T1 from the neutral value (e.g., 2.5 V) is compared with that of the second torque sensor signal T2 from the same, and then the torque sensor signal which has a smaller amount of change from the neutral value is selected as a reference torque T. In other words, if the first torque sensor signal T1 has a smaller amount of change from the neutral value, the process goes to step s32 wherein the first torque sensor signal T1 is set as the reference torque T. In contrast, if the second torque sensor signal T2 has a smaller amount of change from the neutral value, the process goes to step s33 wherein the second torque sensor signal T2 is set as the reference torque T. Then, the process advances to step s34 wherein the upper limit value Th1 and the lower limit value Th2 are set by providing a predetermined width to the upper side and the lower side of the reference torque T respectively. After this, similar processes to those in the above embodiment 2 are carried out.

In such embodiment 3, since the upper limit value and the lower limit value can be set by using the torque sensor signal which has the smaller amount of change from the neutral value as the reference, such advantages can be achieved that the assisting torque needed at the time of failure can be reduced much more and thus the safety of the electric power steering equipment can be improved further more.

Embodiment 4

In the above embodiment 1 or embodiment 3, the torque value is clipped such that torque deviation between the input signal and the output signal of the amplifier and phase compensation circuit 13 can be set below a predetermined value. However, the same advantage can be achieved if the motor target current is clipped in response to the input torque.

Figure 10:
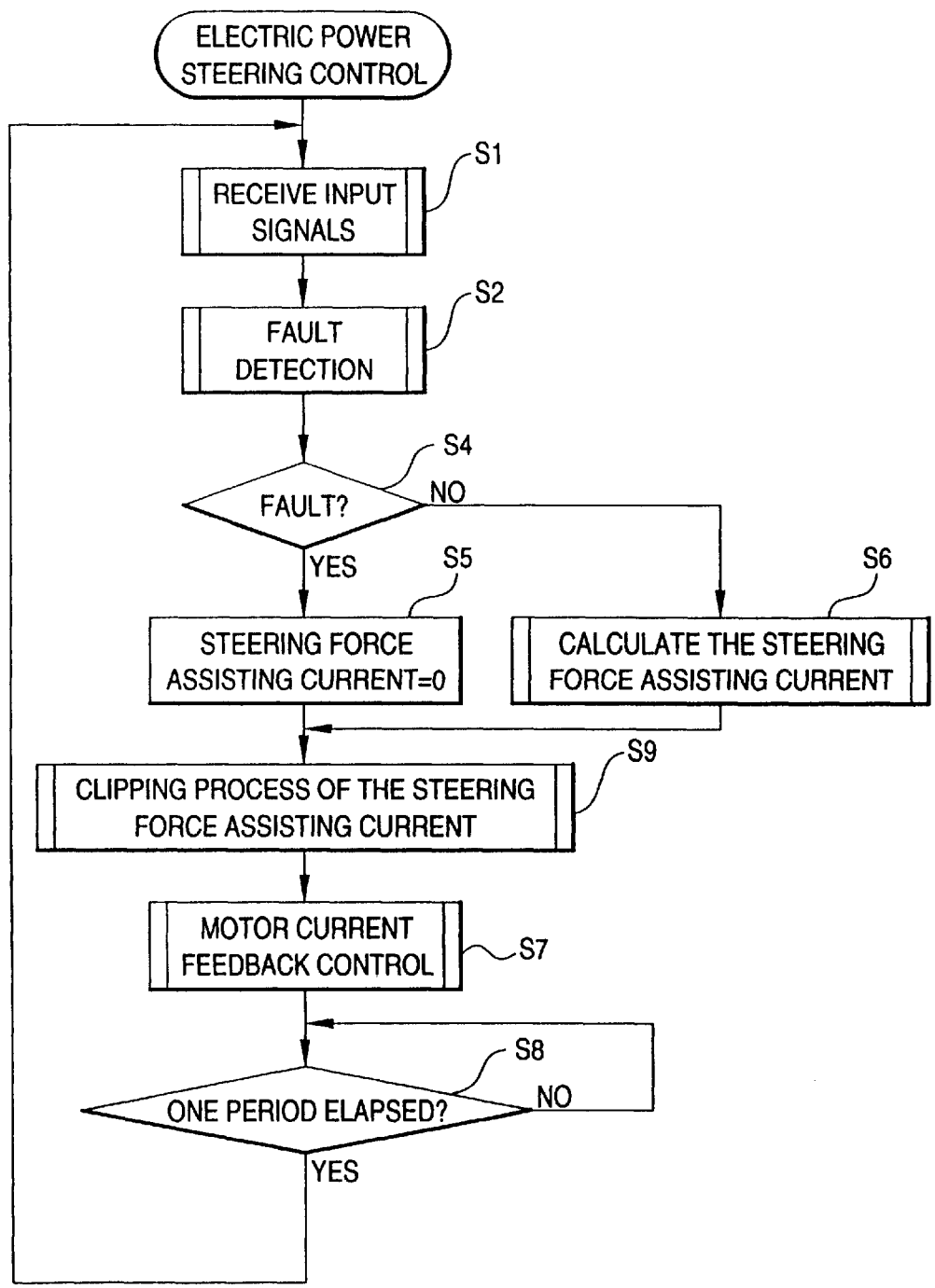
FIG. 10 is a flowchart showing an operation of an electric power steering equipment according to an embodiment 4 of the present invention.

FIG. 10 is a flowchart showing an operation of an electric power steering equipment according to an embodiment 4 of the present invention. This flowchart are basically similar in operation to the flowchart in FIG. 4 explained in the above embodiment 1, but the clipping process of the steering force assisting current in step s9 is added in place of step s3 in FIG. 4. In step s9, the same advantage as that in the above embodiment 1 can be achieved by applying the clipping process of the steering force assisting current after the steering force assisting current has been decided in step s5 or step s6.

Figure 11:
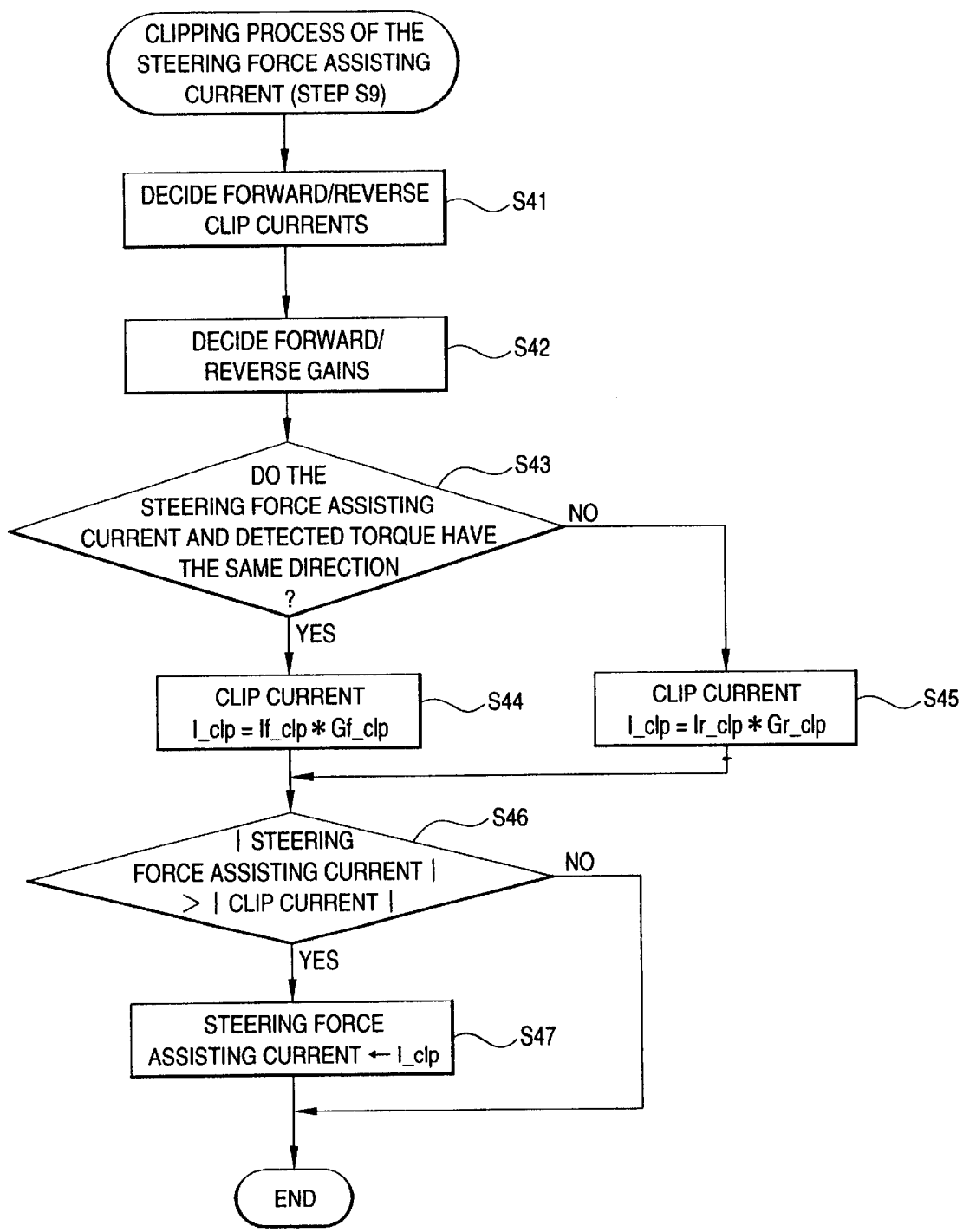
FIG. 11 is a flowchart showing an operation of the electric power steering equipment according to the embodiment 4 of the present invention.
Figure 12A:
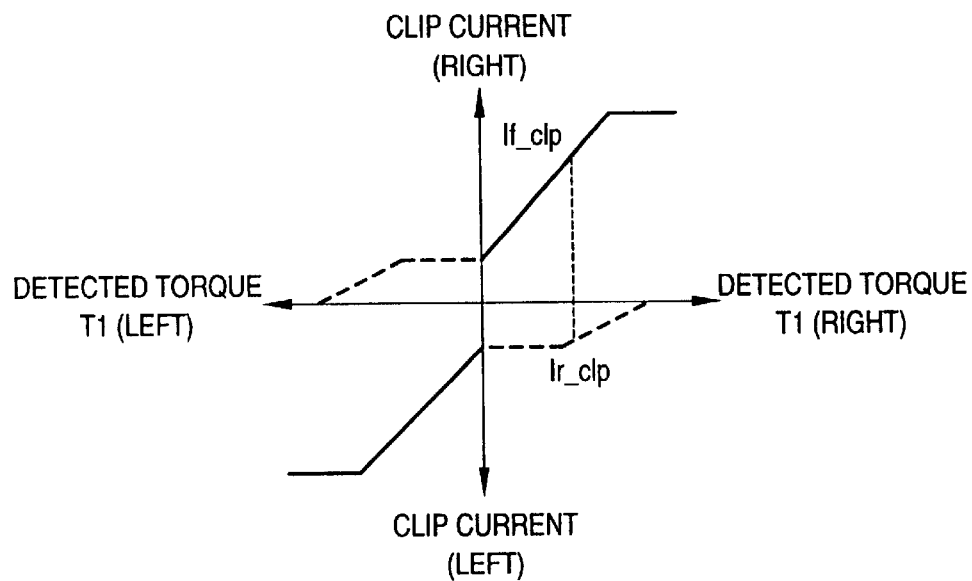
FIGS. 12A and 12B are views showing an operation of a controller of the electric power steering equipment according to the embodiment 4 of the present invention.
Figure 12B:
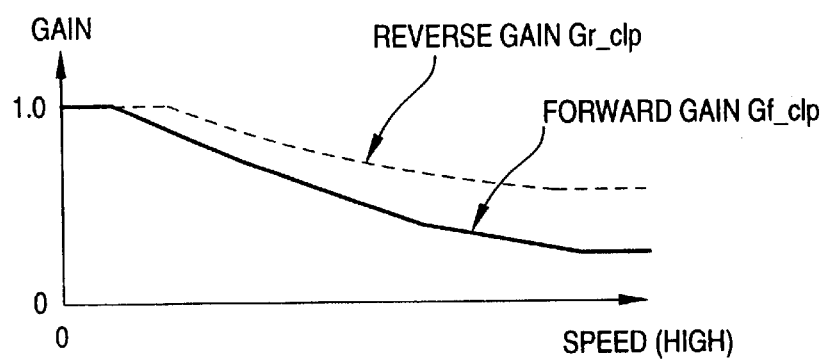

FIG. 11 shows detailed process contents in step s9 in FIG. 10. In step s41, according to the magnitude and the direction of the torque sensor signal T1, both a forward clip current If_clp and a reverse clip current Ir_clp are decided based on the characteristics shown in FIG. 12(a), for example. Then, in step s42, both a forward gain Gf_clp and a reverse gain Gr_clp of the clip current relative to the speed are decided based on the characteristics shown in FIG. 12(b), for example.

Then, in step s43, it is decided whether or not the detected steering force assisting current and the torque sensor signal T1 have the same direction. If they have the same direction, the process goes to step s44 wherein the clip current I_Clp is calculated based on the forward clip current If_clp and the forward gain Gf_clp. If they have the opposite direction, the process goes to step s45 wherein the clip current I_Clp is calculated based on the reverse clip current Ir_clp and the reverse gain Gr_clp.

In step s46, an absolute value of the clip current I_Clp calculated in step s44 or step s45 and an absolute value of the steering force assisting current are compared with each other. If the absolute value of the steering force assisting current is smaller than the absolute value of the clip current I_Clp, the clipping process is not carried out. Then, the current clipping process is ended. In contrast, if the absolute value of the steering force assisting current is larger than the absolute value of the clip current I_Clp, the steering force assisting current is clipped by the clip current I_Clp in step s47. Then, the current clipping process is ended.

In this manner, in the embodiment 4, the upper limit of the steering force assisting current which can be supplied is provided according to the input torque and the speed. Therefore, the embodiment 4 of the present invention can achieve such an advantage that, even if the excessive steering force assisting current is supplied because of the fault of the amplifier and phase compensation circuit, the steering force assisting current can be restricted to an appropriate upper limit value according to the actual input torque and thus the safety can be assured.

Also, like the embodiment 2 and the embodiment 3, it is possible to provide the second torque detecting means as an index to decide the limiting value and to perform the limitation of the steering force assisting current by using this signal. In this case, needless to say, such an advantage can be achieved that the excessive assist can be prevented against not only the back-up for the fault of the amplifier and phase compensation circuit but also the fault of the torque sensor per se, the harness, etc.

Embodiment 5

In the above embodiment 4, the steering force assisting current is clipped. In an embodiment 5, an electric power steering equipment in which a motor-applied voltage is clipped will be explained hereunder.

Figure 13:
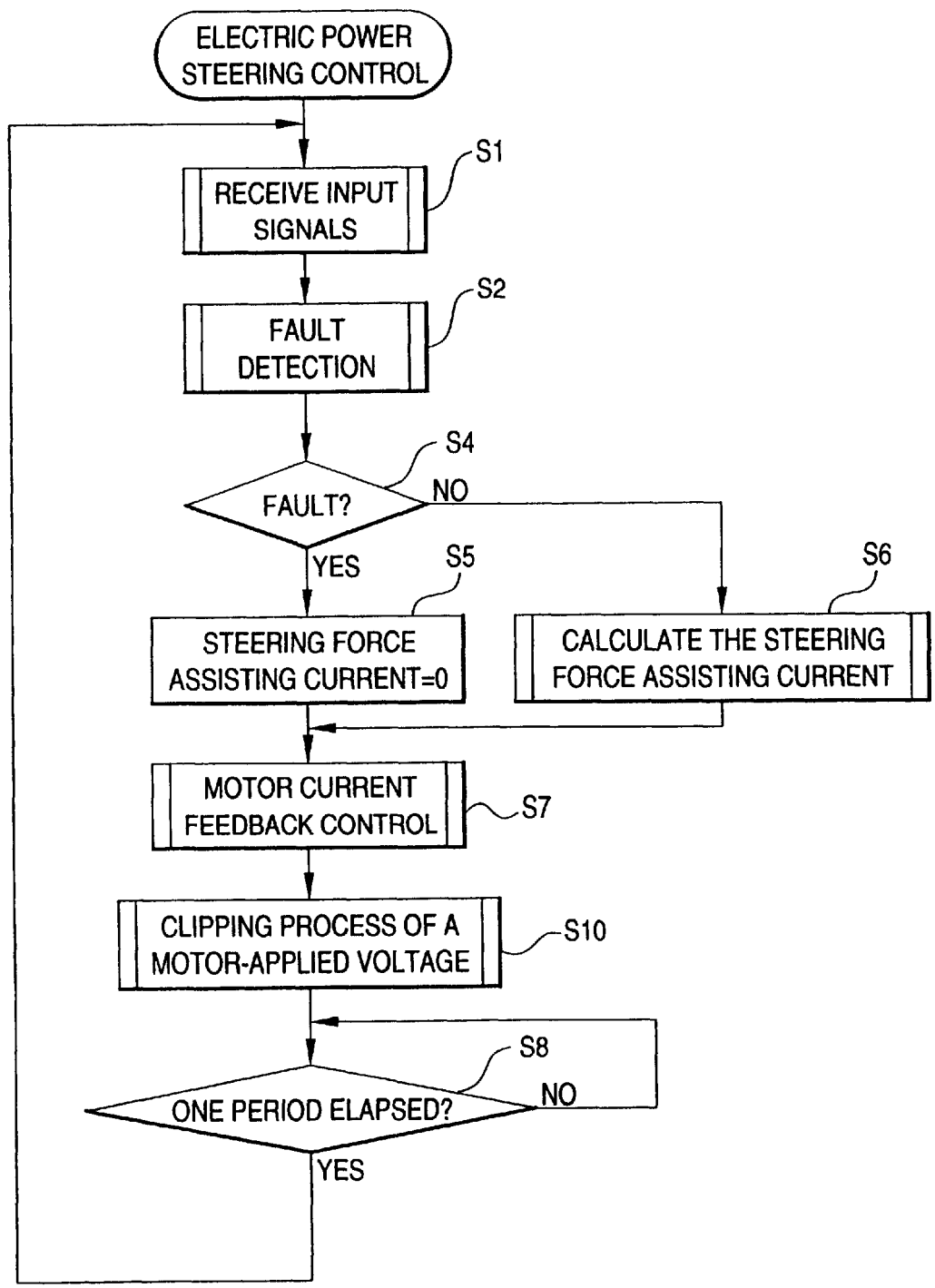
FIG. 13 is a flowchart showing an operation of an electric power steering equipment according to an embodiment 5 of the present invention.

FIG. 13 is a flowchart showing an overall process in the electric power steering equipment according to the embodiment 5 of the present invention. This flowchart are basically similar in operation to the flowchart shown in FIG. 4, but the clipping process of the motor-applied voltage in step s10 is added in place of step s3 in FIG. 4. Since other portions are similar to those in FIG. 4, only the clipping process of the motor-applied voltage in step s10 will be explained hereunder.

Figure 14:
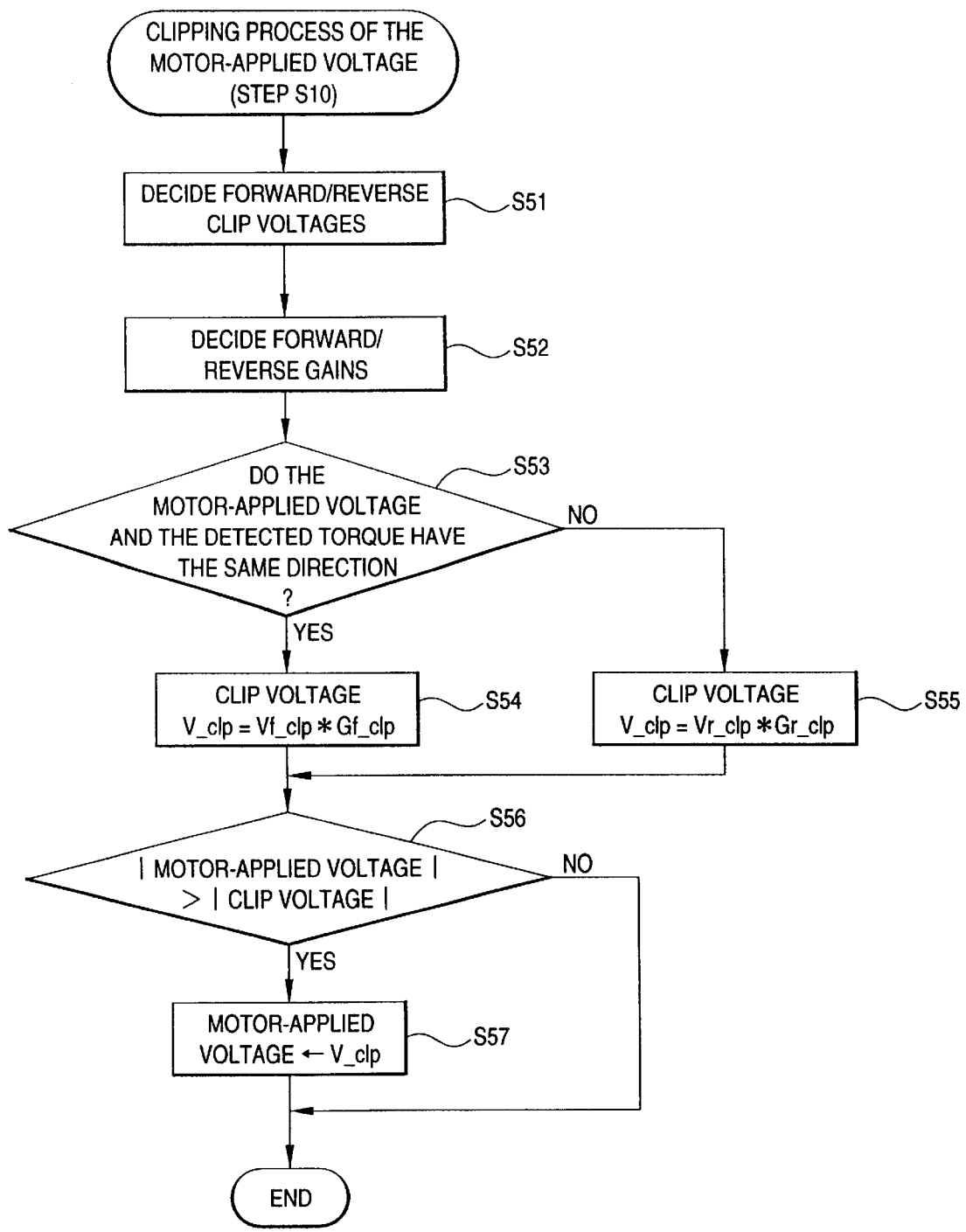
FIG. 14 is a flowchart showing an operation of the electric power steering equipment according to the embodiment 5 of the present invention.
Figure 15A:
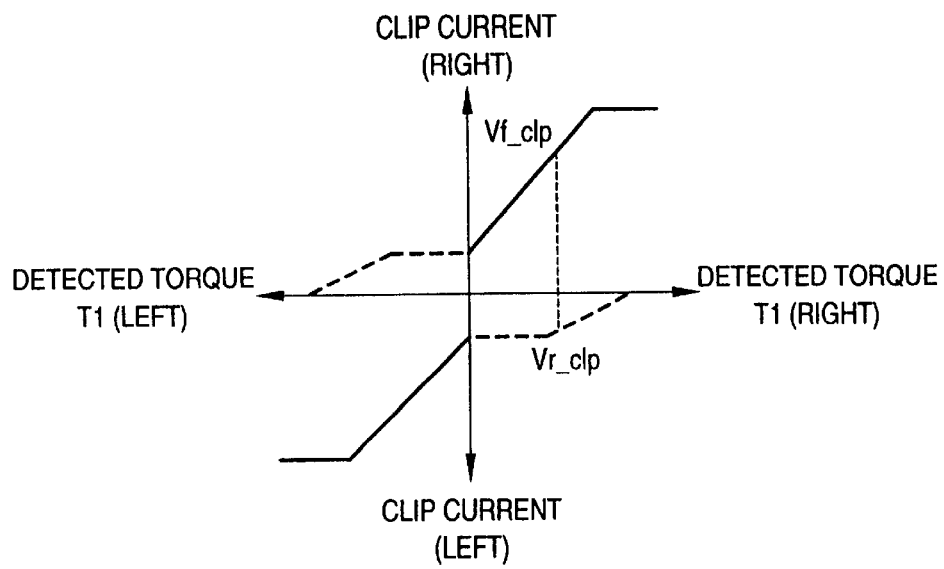
FIGS. 15A and 15B are views showing the operation of the electric power steering equipment according to the embodiment 5 of the present invention.
Figure 15B:
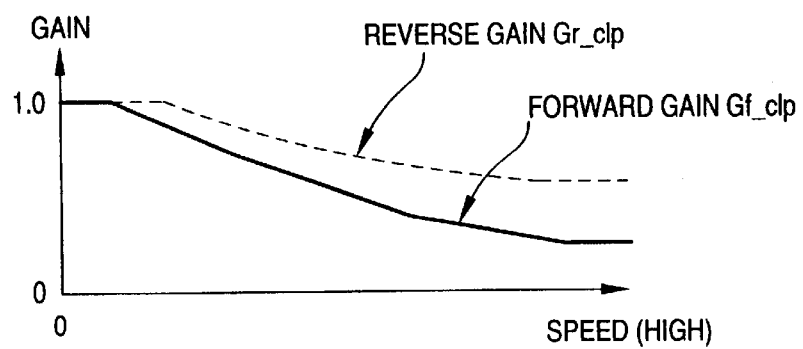

FIG. 14 is a flowchart showing a detailed operation of the voltage clipping process. First, in step s51, according to the magnitude and the direction of the torque sensor signal T1, a forward clip voltage Vf_clp and a reverse clip voltage Vr_clp are decided based on the characteristics shown in FIG. 15A, for example. Then, in step s52, both the forward gain Gf_clp and the reverse gain Gr_clp of the clip voltage relative to the speed are decided based on the characteristics shown in FIG. 15(b), for example.

Then, in step s53, it is decided whether or not the current supplying direction of the motor and the torque sensor signal T1 have the same direction. If they have the same direction, the process advances to step s54 wherein the clip voltage V_Clp is decided based on the forward clip voltage Vf_clp and the forward gain Gf_clp. If they have the opposite direction, the process advances to step s55 wherein the clip voltage V_Clp is decided based on the reverse clip voltage Vr_clp and the reverse gain Gr_clp.

In step s56, an absolute value of the motor-applied voltage is compared with an absolute value of the clip voltage V_Clp calculated in step s54 or step s55. If the absolute value of the motor-applied voltage is smaller than the absolute value of the clip voltage V_Clp, no clipping process is performed. Then, the voltage clipping process is ended. On the contrary, if the absolute value of the motor-applied voltage is larger than the absolute value of the clip voltage V_Clp, the motor-applied voltage is clipped by using the clip voltage V_Clp in step s57. Then, the voltage clipping process is ended.

Here the motor-applied voltage is decided by a duty ratio of the PWM signal which is applied to a motor driving circuit 10 by the motor current feedback control. In the embodiment 5, such an advantage can be achieved that, even if the command value of the steering force assisting current is increased falsely, the excessive current for the motor can be prevented by clipping the motor-applied voltage, i.e., the duty ratio of the PWM signal in response to the torque sensor signal. In addition, such another advantage can also be achieved that the excessive applied voltage due to the fault of the motor current feedback control loop can be prevented.

Embodiment 6

In the above embodiment, 2, 3, 4 or 5, the abnormal signal being output from the amplifier and phase compensation circuit 13 is directly clipped by the torque corrected value of the torque sensor signal. However, calculation for the phase compensation may be applied to the torque sensor signal by software, and then an output signal of the amplifier and phase compensation circuit 13 may be clipped based on the result. A filter which coincides with a time constant of phase lead/lag in the amplifier and phase compensation circuit 13 may be constructed by using an approach such as bilinearity transformation, etc.

Figure 16:
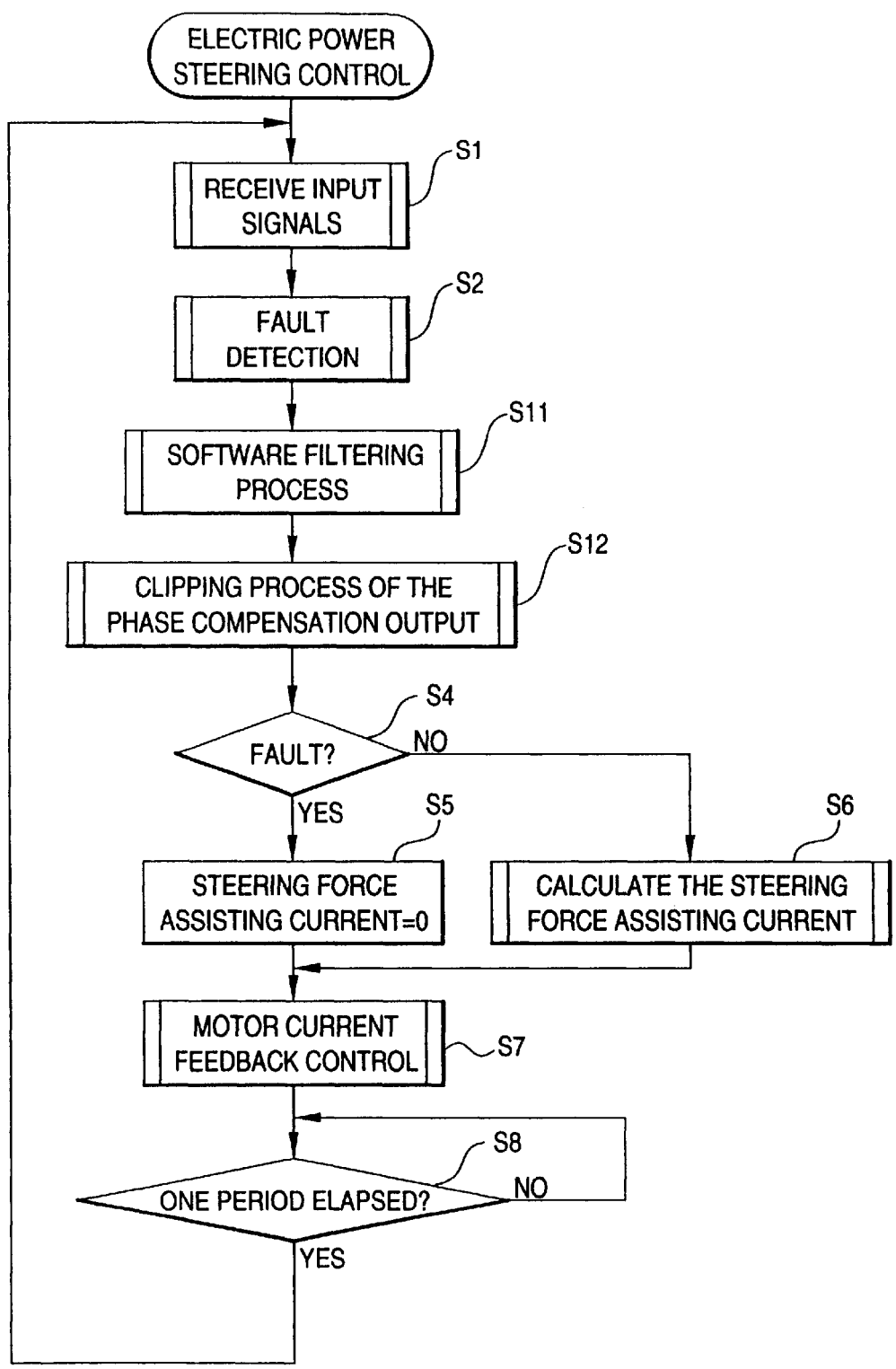
FIG. 16 is a flowchart showing an operation of an electric power steering equipment according to an embodiment 6 of the present invention.

FIG. 16 is a flowchart showing an operation of an electric power steering equipment according to the embodiment 6 of the present invention. This flowchart is basically similar in operation to the flowchart in FIG. 4. However, since step s11 and step s12 are different, processes in these steps will be explained hereunder.

In step s11, a software filtering process which has the phase characteristic equivalent to the output of the amplifier and phase compensation circuit 13 is applied to the torque sensor signal T1. A resultant torque sensor signal after the calculation is used as the torque sensor signal.

In step s12, an upper limit value and a lower limit value are calculated by providing a predetermined width to upper and lower sides of the torque sensor signal which has been subjected to the phase compensation in step s11, respectively. The phase compensation output TV1 of the amplifier and phase compensation circuit 13 is clipped by using the upper limit value and the lower limit value.

Figure 17:
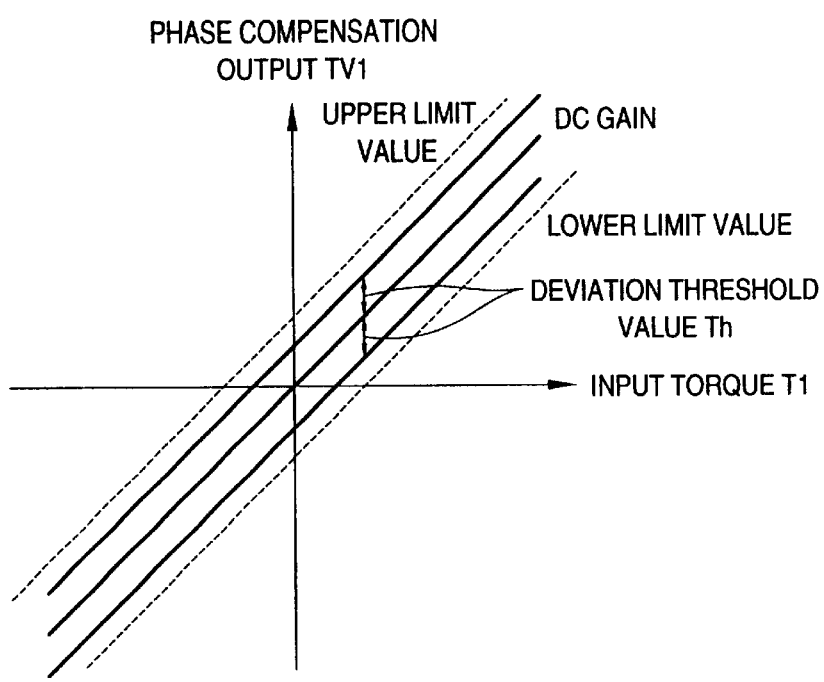
FIG. 17 is a flowchart showing an operation of a controller of the electric power steering equipment according to the embodiment 6 of the present invention.

The torque sensor signal whose phase is compensated by the software filter as the reference is compensated to have the characteristic equivalent to the output of the amplifier and phase compensation circuit 13. Therefore, as shown in FIG. 17, the predetermined width provided in step s12 can reduce the margin of the clip torque threshold value for the influence of the transient response rather than the threshold value set in the above embodiment 1. As a result, the safer clipping process can be accomplished.

Embodiment 7

In the above embodiment 1 or embodiment 6, the predetermined upper limit value and the predetermined lower limit value are set and then the clipping process of the target signal is immediately carried out when the target signal is out of this range. However, the upper limit value and the lower limit value may be changed gradually in accordance with the continued time during when the target signal is out of the range, and then the target signal may be clipped by the smaller value.

According to the embodiment 7, a clipping value can be reduced gradually with the lapse of time even when the amplifier and phase compensation circuit is broken down. Therefore, such advantages can be achieved that, since the generated assisting torque can be reduced gradually with the lapse of time, generation of the excessive assisting torque can be prevented and that, even if the predetermined width, i.e., the margin width used in the fault decision is set relatively large, the assisting torque is not abruptly changed.

In this case, the upper limit value and the lower limit value are changed with the lapse of time. All change modes such as the linear change, the nonlinear change, etc. may be applied as their change mode. Such change mode may be set in answer to the performance of the vehicle, the driver's taste, etc.

Embodiment 8

In the above embodiment 7, the upper limit value and the lower limit value used in the clipping process are changed with the lapse of time. As the change mode, the clipping process may be interrupted within a predetermined time period after the target signal has been out of the range between the upper limit value and the lower limit value, and then the clipping process may be started after a predetermined time has been elapsed.

In this fashion, since the clipping process can be interrupted until the predetermined time has been elapsed, the behavior which is against the driver's will can be prevented, and also the control torque can be clipped without impairment of the steering feeling but in a necessarily and sufficiently short time at the time of fault. As a result, the steering feeling and the safety can be satisfied together.

In all embodiments 1 to 8 mentioned above, the predetermined width defined by the upper limit value and the lower limit value is set constant. In this case, the safety in high speed traveling can be maintained by changing the predetermined width in response to the speed, especially by reducing the predetermined width as the speed is increased.

Also, if the predetermined width can be changed according to the magnitude of the detected torque value from the torque sensor, the event that the excessive assisting torque is generated when the driver softly turns the steering wheel and thus the behavior of the vehicle becomes unstable can be prevented.

In addition, if the predetermined width is set relatively wide in the same direction as the detected torque value from the torque sensor but set relatively narrow in the opposite direction, the behavior which is against the driver's will can be prevented to thus improve the safety much more.

Furthermore, it may be decided whether or not the detected value of the torque sensor is within a predetermined range (for example, 0.2 to 4.8 V), and then the motor driving control itself may be inhibited if the detected value is out of the predetermined range. According to this system, when the torque sensor gets out of order, the clipping process is never carried out based on the abnormal detected value and the safety can be improved further more.

Moreover, in all above embodiments 1 to 8, the clipping process is carried out by using the upper limit value and the lower limit value. In this case, the value before the clipping process and the value after the clipping process are compared with each other and then the value on the neutral side, i.e., on the side at which the assisting torque generated by the motor whose drive is controlled is small may be employed to execute the control. Accordingly, generation of the excessive assisting torque can be prevented without the impairment of the controllability in "no-hands" return.

The electric power steering equipment according to the present invention comprises the motor for providing the steering assisting force to the steering shaft, the torque detecting means for detecting the steering torque, the amplifying and phase-compensating means for amplifying and phase-compensating the detected value of the torque detecting means, and the controlling means for controlling drive of the motor based on the output of the amplifying and phase-compensating means, wherein the controlling means restricts the control signal for driving the motor by the upper limit value and the lower limit value which are set in response to the detected value of the torque detecting means. Therefore, the electric power steering equipment can be obtained which can prevent generation of the excessive assisting torque until the fault is decided after the amplifying and phase-compensating means gets out of order and also can provide the higher safety.

Also, the electric power steering equipment according to the present invention comprises the motor for providing the steering assisting force to the steering shaft, the first torque detecting means and the second torque detecting means for detecting the steering torque respectively, the amplifying and phase-compensating means for amplifying and phase-compensating the detected value of the first torque detecting means, and the controlling means for controlling a drive of the motor based on the output of the amplifying and phase-compensating means, wherein the controlling means restricts the control signal for driving the motor by using the upper limit value and the lower limit value which are set in response to the detected value of the second torque detecting means. Therefore, the electric power steering equipment can be obtained which can prevent generation of the excessive assisting torque until the fault is decided after the first torque detecting means or the amplifying and phase-compensating means gets out of order and also can provide the high safety.

In addition, the electric power steering equipment according to the present invention comprises the motor for providing the steering assisting force to the steering shaft, the first torque detecting means and the second torque detecting means for detecting the steering torque respectively, the amplifying and phase-compensating means for amplifying and phase-compensating the detected value of the first torque detecting means, and the controlling means for controlling drive of the motor based on an output of the amplifying and phase-compensating means, wherein the controlling means selects the smaller upper limit value and the smaller lower limit value out of the first upper limit value and the first lower limit value, which are set in response to the detected value of the first torque detecting means, and the second upper limit value and the second lower limit value, which are set in response to the detected value of the second torque detecting means, as the upper limit value and the lower limit value, and then restricts the control signal for driving the motor by using the upper limit value and the lower limit value. Therefore, the electric power steering equipment can be obtained which can prevent generation of the excessive assisting torque until the fault is decided after either torque detecting means or the amplifying and phase-compensating means gets out of order and also can provide the high safety.

Further, the controlling means has the amplification and phase-compensation calculating means for calculating amplification and phase compensation of the detected value of the torque detecting means, and the upper limit value and the lower limit value are set in response to the calculated result of the amplification and phase-compensation calculating means.

Furthermore, the controlling means limits the control signal by restricting the output of the amplifying and phase-compensating means by using the upper limit value and the lower limit value. Therefore, the electric power steering equipment can be obtained which can prevent generation of the excessive assisting torque until the fault is decided after the amplifying and phase-compensating means gets out of order and also can provide the high safety.

Moreover, the controlling means restricts the motor current calculated in response to the output of the amplifying and phase-compensating means by using the upper limit value and the lower limit value. Therefore, the electric power steering equipment can be obtained which can prevent generation of the excessive assisting torque until the fault is decided after the amplifying and phase-compensating means gets out of order, can restrict immediately the torque generated by the motor by limiting the motor current which has the direct influence on the control signal, and also can provide the higher safety.

Besides, the controlling means limits the control signal by restricting the motor-applied voltage being calculated in response to the output of the amplifying and phase-compensating means by using the upper limit value and the lower limit value. Therefore, the electric power steering equipment can be obtained which can prevent generation of the excessive assisting torque until the fault is decided after the amplifying and phase-compensating means gets out of order, can limit the torque generated by the motor by restricting the applied voltage for the motor if the current detecting circuit employed in the so-called current feedback loop is broken down, and also can provide the higher safety.

Further, the controlling means compares the preceding value of restriction and the succeeding value of restriction during the restriction by using the upper limit value and the lower limit value, and controls drive of the motor by using the value on the neutral side. Therefore, generation of the excessive assisting torque can be suppressed without degradation of controllability in "no hands" return.

Furthermore, the electric power steering equipment according to the present invention further comprises the speed detecting means for detecting the speed of the vehicle, and the controlling means changes the width between the upper limit value and the lower limit value in answer to the speed. Therefore, the safety can be assured during the high speed traveling.

Moreover, the controlling means changes the width between the upper limit value and the lower limit value in answer to the magnitude of the detected value of the torque detecting means. Therefore, the event that the excessive assisting torque is generated when the driver turns softly the steering wheel and thus the behavior of the vehicle becomes unstable can be prevented.

Besides, the controlling means sets the width between the upper limit value and the lower limit value large in the same direction as the direction of the detected value of the torque detecting means and the width between them small in the opposite direction to the direction of the detected value of the torque detecting means. Therefore, the behavior which is against the driver's will can be prevented and thus the safety can be improved much more.

In addition, the controlling means stops motor driving control when the detected value of the torque detecting means gets out of the predetermined range. Therefore, the clipping process performed based on the detected value of the wrong torque detecting means can be prevented and thus the safety can be improved much more.

Also, the controlling means changes the width between the upper limit value and the lower limit value in response to the elapsed time after an output of the amplifying and phase-compensating means or either the motor current or the motor-applied voltage calculated in response to the output of the amplifying and phase-compensating means is out of a range between the upper limit value and the lower limit value. Therefore, such advantages can be achieved that, since the clipping value can be reduced gradually with the lapse of the time even if the amplifier and phase-compensation circuit gets out of order, the generated assisting torque can be reduced gradually with the lapse of the time, and generation of the excessive assisting torque can be prevented, and the assisting torque is not abruptly changed even when the predetermined width, i.e., the margin width in the fault decision is set relatively large.

Finally, the controlling means inhibits restriction by using the upper limit value and the lower limit value until the predetermined time has elapsed after the output of the amplifying and phase-compensating means or either the motor current or the motor-applied voltage calculated in response to the output of the amplifying and phase-compensating means is out of the range between the upper limit value and the lower limit value. Therefore, the behavior which is against the driver's will can be prevented and also the safety can be improved much more.

What is claimed is:

1. An electric power steering apparatus comprising:
   a motor for providing a steering assisting force to a steering shaft;
   a torque detecting means coupled to said steering shaft for detecting a steering torque;
   an amplifying and phase-compensating means for receiving a detected steering torque value from said torque detecting means and amplifying and phase-compensating said detected steering torque value; and
   a controlling means for controlling a drive of the motor based on an output signal received from said amplifying and phase-compensating means, wherein
      said controlling means limits a value range of a control signal for driving the motor by an upper limit value and a lower limit value which are set in response to the detected steering torque value generated by said torque detecting means.

2. An electric power steering apparatus comprising:
   a motor for providing a steering assisting force to a steering shaft;
   a first torque detecting means and a second torque detecting means, coupled to said steering shaft, for detecting a steering torque and generating first and second detected steering torque values respectively;
   an amplifying and phase-compensating means for amplifying and phase-compensating the first detected steering torque value generated by said first torque detecting means; and
   a controlling means for controlling a drive of the motor based on an output signal received from said amplifying and phase-compensating means, wherein
      said controlling means limits a value range of a control signal for driving the motor by using an upper limit value and a lower limit value which are set in response to the second detected steering torque value generated by said second torque detecting means.

3. An electric power steering apparatus comprising:
   a motor for providing a steering assisting force to a steering shaft;
   a first torque detecting means and a second torque detecting means, coupled to said steering shaft, for detecting a steering torque and generating first and second detected steering torque values respectively;
   an amplifying and phase-compensating means for amplifying and phase-compensating the first detected steering torque value generated by said first torque detecting means; and
   a controlling means for generating a control signal for driving the motor based on an output signal received from said amplifying and phase-compensating means, wherein
      said controlling means selects one of the first detected steering torque value and the second detected steering torque value based on an amount of change of the first and second detected steering torque values from a predetermined value, sets an upper limit value and a lower limit value based on the selected one of said first and second detected steering torque values, and limits a value range of a control signal for driving the motor by using the upper limit value and the lower limit value.

4. The electric power steering apparatus according to claim 1, wherein
   said controlling means includes an amplification and phase-compensation calculating means for calculating amplification and phase compensation factor of the amplifying and phase-compensating means for amplifying and phase-compensating the detected steering torque value generated by said torque detecting means, and sets the upper limit value and the lower limit value in response to a calculated result of said amplification and phase-compensation calculating means.

5. The electric power steering apparatus according to claim 2, wherein said controlling means includes an amplification and phase-compensation calculating means for calculating amplification and phase compensation factor of the amplifying and phase-compensating means for amplifying and phase-compensating the first detected steering torque value generated by said first torque detecting means, and sets the upper limit value and the lower limit value in response to a calculated result of said amplification and phase-compensation calculating means.

6. The electric power steering apparatus according to claim 3, wherein said controlling means includes an amplification and phase-compensation calculating means for calculating amplification and phase compensation factor of the amplifying and phase-compensating means for amplifying and phase-compensating the first detected steering torque value generated by said first torque detecting means, and sets the upper limit value and the lower limit value in response to a calculated result of said amplification and phase-compensation calculating means.

7. The electric power steering apparatus according to claim 1, wherein said controlling means limits a value range of the output signal of said amplifying and phase-compensating means by using the upper limit value and the lower limit value.

8. The electric power steering apparatus according to claim 2, wherein said controlling means limits a value range of the output signal of said amplifying and phase-compensating means by using the upper limit value and the lower limit value.

9. The electric power steering apparatus according to claim 1, wherein said controlling means limits a value range of a motor current calculated in response to the output signal of said amplifying and phase-compensating means by using the upper limit value and the lower limit value.

10. The electric power steering apparatus according to claim 2, wherein said controlling means limits a value range of a motor current calculated in response to the output signal of said amplifying and phase-compensating means by using the upper limit value and the lower limit value.

11. The electric power steering apparatus according to claim 1, wherein said controlling means limits a value range of a motor-applied voltage calculated in response to the output signal of said amplifying and phase-compensating means by using the upper limit value and the lower limit value.

12. The electric power steering apparatus according to claim 2, wherein said controlling means limits a value range of a motor-applied voltage calculated in response to the output signal of said amplifying and phase-compensating means by using the upper limit value and the lower limit value.

13. The electric power steering apparatus according to claim 1, wherein said controlling means compares a preceding value of the control signal and a succeeding value of control signal which has been limited by using the upper limit value and the lower limit value, and controls a drive of the motor by using a value the control signal which results in a least amount of assisting torque generated by said motor.

14. The electric power steering apparatus according to claim 1, further comprising:

a speed detecting means for detecting a speed of a vehicle, wherein said controlling means changes a width between the upper limit value and the lower limit value based on the speed detected by said speed detecting means.

15. The electric power steering apparatus according to claim 1, wherein said controlling means changes a width between the upper limit value and the lower limit value in response to a magnitude of the detected steering torque value of said torque detecting means.

16. The electric power steering apparatus according to claim 1, wherein said controlling means sets a width between the upper limit value and the lower limit value in a same direction as a direction of the detected steering torque value generated by said torque detecting means to be larger than the width between the upper limit value and the lower limit value in an opposite direction to the direction of the detected steering torque value generated by said torque detecting means.

17. The electric power steering apparatus according to claim 1, wherein said controlling means stops motor driving control, when the detected steering torque value generated by said torque detecting means exceeds a predetermined range.

18. The electric power steering apparatus according to claim 1, wherein said controlling means changes a width between the upper limit value and the lower limit value in response to an elapsed time after the output signal of said amplifying and phase-compensating means or either a motor current or a motor-applied voltage calculated in response to the output signal of said amplifying and phase-compensating means is out of a range between the upper limit value and the lower limit value.

19. The electric power steering apparatus according to claim 1, wherein said controlling means inhibits restriction by using the upper limit value and the lower limit value until a predetermined time has elapsed after an output of said amplifying and phase-compensating means or either a motor current or a motor-applied voltage calculated in response to the output of said amplifying and phase-compensating means is out of a range between the upper limit value and the lower limit value.

* * * * *